United States Patent
Kondou et al.

(10) Patent No.: US 9,599,843 B2
(45) Date of Patent: Mar. 21, 2017

(54) OPTICAL MODULATOR

(71) Applicant: Sumitomo Osaka Cement Co., Ltd., Chiyoda-ku, Tokyo (JP)

(72) Inventors: Katsutoshi Kondou, Tokyo (JP); Junichiro Ichikawa, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 14/765,924

(22) PCT Filed: Feb. 7, 2014

(86) PCT No.: PCT/JP2014/052949
§ 371 (c)(1),
(2) Date: Aug. 5, 2015

(87) PCT Pub. No.: WO2014/123230
PCT Pub. Date: Aug. 14, 2014

(65) Prior Publication Data
US 2015/0370095 A1  Dec. 24, 2015

(30) Foreign Application Priority Data
Feb. 8, 2013  (JP) .................................. 2013-023520

(51) Int. Cl.
*G02F 1/035*  (2006.01)
*G02F 1/225*  (2006.01)

(52) U.S. Cl.
CPC .............. *G02F 1/035* (2013.01); *G02F 1/225* (2013.01); *G02F 2201/12* (2013.01)

(58) Field of Classification Search
CPC .......... G02F 1/01; G02F 1/0102; G02F 1/011; G02F 1/03; G02F 1/0305; G02F 1/0327;
(Continued)

(56) References Cited

FOREIGN PATENT DOCUMENTS

JP    H04-288518 A    10/1992
JP    H6-067130 A    3/1994
(Continued)

OTHER PUBLICATIONS

English machine translation of JP 2012-145696A.*
Japan Patent Office, Notice of Allowance issued on Sep. 6, 2016, in Japan Patent App. No. 2014-511344, Tokyo, Japan.

*Primary Examiner* — Uyen Chau N Le
*Assistant Examiner* — John M Bedtelyon
(74) *Attorney, Agent, or Firm* — Taft Stettinius & Hollister LLP (57) ABSTRACT

An aspect of the present invention is an optical modulator including an electro-optic substrate, an optical waveguide, and a signal electrode for applying an electric field corresponding to a modulation signal to the optical waveguide. The electro-optic substrate includes a trench portion, which is formed by digging a surface of the electro-optic substrate, and a ridge portion, which is formed in a ridge shape by the trench portion so that an optical waveguide is provided. The trench portion includes a first trench portion, which is a trench portion between a pair of branched optical waveguides, and a second trench portion, which is a trench portion other than the first trench portion. Digging depths of the first and second trench portions are different.

8 Claims, 7 Drawing Sheets

(58) Field of Classification Search
CPC ...... G02F 1/0344; G02F 1/035; G02F 1/0356; G02F 1/21; G02F 1/225; G02F 1/2255; G02F 1/2257; G02B 6/12; G02B 2006/12097; G02B 2006/12142; G02B 2006/12176
See application file for complete search history.

(56) References Cited

FOREIGN PATENT DOCUMENTS

| | | |
|---|---|---|
| JP | H8-166566 A | 6/1996 |
| JP | H10-039266 A | 2/1998 |
| JP | H10-090638 A | 4/1998 |
| JP | 2007-133442 A | 5/2007 |
| JP | 2010-078914 A | 4/2010 |
| JP | 2011-090332 A | 5/2011 |
| JP | 2012-145696 A | 8/2012 |

* cited by examiner

OPTICAL MODULATOR

TECHNICAL FIELD

The present invention relates to an optical modulator.

BACKGROUND ART

An optical modulator having an optical waveguide structure in which an optical waveguide is formed on an electro-optic substrate has been known as a mature technology. A Mach-Zehnder interferometer type optical modulator has a structure in which light waves propagating through different optical waveguides interfere with each other, and the optical intensity of light after the interference is determined by the difference in the amount of phase shifts between the light waves propagating through the optical waveguides (for example, refer to Patent Literature No. 1). By changing the difference in the amount of phase shifts, it is possible to change the output optical intensity of the optical modulator.

In the Mach-Zehnder interference type optical modulator disclosed in Patent Literature No. 1, the vicinity of an optical waveguide may be trenched to form the optical waveguide in a ridge shape. By forming the optical waveguide in a ridge shape, the effective overlap integral of the electric field generated by the electrical signal and propagating light wave in the optical waveguide can be improved. Accordingly, it is possible to reduce the driving voltage. In addition, by forming the optical waveguide in a ridge shape, the effective refractive index (microwave effective refractive index) of a high-frequency control signal (electrical signal) and the characteristic impedance are optimized. Accordingly, it is possible to improve the microwave characteristics.

CITATION LIST

Patent Literature

[Patent Literature No. 1] Japanese Laid-open Patent Publication No. 10-90638
[Patent Literature No. 2] Japanese Laid-open Patent Publication No. 2007-133441
[Patent Literature No. 3] Japanese Laid-open Patent Publication No. 2011-090332

SUMMARY OF INVENTION

Technical Problem

Here, the digging depth of a ridge shape suitable for realizing two effects based on the formation of the optical waveguide in the ridge shape, that is, a reduction in the driving voltage and an improvement in the microwave characteristics differs depending on the ridge shape, electrode shape, and location where an electrode is formed. For fabrication process of the optical waveguide in a ridge shape, a dry etching method is generally used. After processing, a groove on the optical waveguide side has an inverted trapezoidal shape, and the ridge shape has an upright trapezoidal shape. The base angle of the ridge shape which is an upright trapezoidal shape depends on the processing method and conditions, and is 30° to 85°. However, in order to express the effect of reducing the driving voltage, 70° or more is reasonable. However, in the case of the ridge shape of the conventional Mach-Zehnder interferometer type optical modulator disclosed in Patent Literature No. 1, such a ridge shape (ridge width and angle) has not sufficiently been taken into consideration. Accordingly, it has not been possible to obtain sufficiently both the effect of reducing the driving voltage of the broadband modulator and the effect of improving the microwave characteristics.

For example, when the broadband modulator is a differential quadrature phase shift keying (DQPSK) modulator or a quadrature amplitude modulation (QAM) modulator having a driving Baud rate exceeding 25 GHz, a voltage range in which the output voltage or the output of the driver is linear is limited. Therefore, it is necessary to lengthen the active electrode of the modulator, to almost completely match the effective refractive index (microwave effective refractive index) of a high-frequency control signal (electrical signal) to the refractive index of propagating light wave, and to dig a groove suitable for reducing the driving voltage. When these design guides are given priority, the impedance of an electrode is likely to deviate from the impedance (in standard, 50Ω) of a radio frequency (RF) signal connector portion. Even if the impedance deviates about 5Ω to 10Ω, the return loss is −20 dB or less. Accordingly, degradation of the amplitude response due to reflection losses of the control electrical signal is relatively small. However, due to the presence of discontinuities with respect to the impedance 50Ω of the RF signal connector portion, the frequency dependence of the phase delay of the control signal becomes discontinuous, and the optical modulation signal is degraded. This is because, even if the control signal fed to the optical modulator is good, the frequency dependence of the phase delay is caused by reflection of the control signal, interference, and phase changes at the discontinuities occurs in the control signal propagating through the electrode portion of the modulator since the impedances of the RF connector portion (control signal feeding portion) of the modulator, electrodes of the modulator, and the impedance of the terminating resistor (control signal terminating portion) are different.

In the case of a digital binary modulation, such as Return to Zero (RZ) modulation and Non Return to Zero (NRZ) modulation that have been widely used up to now, the problem of the frequency dependence of the phase delay was insignificant in practice, which was negligible in the system operation. However, in the case of a multi-level phase modulation in a QPSK modulator, a QAM modulator, and the like or an analog modulation, the degradation has a large influence on the transmission quality. For this reason, the problem cannot be neglected. Therefore, it is desirable to minimize the difference between the impedance of the electrode portion and the terminating resistor portion and the impedance of the RF connector. Preferably, the aforementioned impedance difference is ±5Ω or less at which the standing wave ratio (SWR) due to impedance mismatch is 1.1 or less. More preferably, the aforementioned impedance difference is ±2Ω or less at which the SWR due to impedance mismatch is 1.05 or less.

In Patent Literature No. 1, there is a description that the relationship of Gr≤G is satisfied between the surface digging width Gr and the gap G between the signal electrode and the ground electrode. This design guide is effective to keep the impedance Z of the electrode at a predetermined magnitude or more without unnecessarily narrowing the electrode gap Gr. However, in actual processing, the cross-sectional shape of the trenched groove is an inverted trapezoidal shape and the cross-sectional shape of the optical waveguide is an upright trapezoidal shape. Since this is a structure in which a substrate portion, which is a high relative dielectric constant material, remains much, this is a disadvantageous configuration in a design concept to increase the impedance Z of the electrode. In addition, since the effect of electrode impedance increase due to the groove formation decreases as the base angle of the upright trapezoidal shape of the ridge decreases, it is difficult to increase the impedance.

Based on the design of realizing the driving voltage reduction and matching between the microwave effective refractive index and the refractive index of propagating light wave, in order to match the impedance Z of the electrode to the impedance of the RF signal connector portion, the adjustment of the electrode gap Gr, the depth d of the groove, and the shape and position of the electrode according to the angle of the ridge waveguide can be considered. Here, in order to realize a bandwidth increase and a driving voltage reduction in the high-frequency band, it is necessary to reduce the propagation loss of the control signal. Therefore, in order to realize a practical broadband QPSK modulator or broadband QAM modulator, it is necessary to use an electrode structure with a large surface area and cross-sectional area in addition to the ridge-shaped optical waveguide. For this reason, it is difficult to match the impedance to exactly 50Ω in practice. That is, when the driving voltage reduction and the matching between the microwave effective refractive index and the refractive index of propagating light wave are given priority at the time of design, the impedance is likely to be a value lower than 50Ω as disclosed in Patent Literature Nos. 2 and 3. From the above, a configuration with a high degree of freedom in design has been demanded in which velocity matching, driving voltage reduction, and impedance matching can be simultaneously realized.

An aspect of the present invention provides a broadband low driving voltage optical modulator capable of sufficiently obtaining both the effect of reducing the driving voltage and the effect of improving the microwave characteristics.

Solution to Problem

An optical modulator according to an aspect of the present invention is an optical modulator including an electro-optic substrate, an optical waveguide, and a signal electrode for applying an electric field corresponding to a modulation signal to the optical waveguide. The electro-optic substrate includes a trench portion, which is formed by digging a surface of the electro-optic substrate, and a ridge portion, which is formed in a ridge shape by the trench portion so that an optical waveguide is provided. The trench portion includes a first trench portion, which is a trench portion between a pair of branched optical waveguides, and a second trench portion, which is a trench portion other than the first trench portion. Digging depths of the first and second trench portions are different.

In such an optical modulator, a trench portion for forming the optical waveguide in a ridge shape is formed on both sides of the optical waveguide, and the first trench portion that is a trench portion between a pair of branched optical waveguides and the second trench portion that is the other trench portion are formed so as to have different digging depths. The driving voltage of the optical waveguide is mainly determined based on the digging depth of the first trench portion, and the microwave characteristics of the optical waveguide are determined based on the digging depths of the first and second trench portions. Accordingly, by forming the first and second trench portions in different digging depths, the digging depth of the first trench portion can be set to a depth suitable for reducing the driving voltage of the optical waveguide and improving the microwave characteristics and the digging depth of the second trench portion can be set to a depth suitable for improving the microwave characteristics. Therefore, it is possible to sufficiently obtain both the effect of reducing the driving voltage and the effect of improving the microwave characteristics.

A difference between the digging depths of the first and second trench portions may be 2 µm or less. When the difference between the digging depths is large, a change in the distortion characteristics of the electro-optic substrate due to stress becomes a problem. In this case, it is possible to reduce the stress applied to the electro-optic substrate by setting the difference between the digging depths to 2 µm or less.

A relationship between the digging depths of the first and second trench portions may be determined according to at least one of the ridge shape and widths of the first and second trench portions. By determining the digging depth according to at least one of the ridge shape and the width of the trench portion, it is possible to reduce the driving voltage and to improve the microwave characteristics.

The digging depth of the first trench portion may be larger than the digging depth of the second trench portion in a case where the widths of the first and second trench portions are 9 µm or less, and the digging depth of the first trench portion may be smaller than the digging depth of the second trench portion in a case where the widths of the first and second trench portions are larger than 9 µm. By determining the digging depth of the first trench portion to be a depth at which the driving voltage is reduced, according to the widths of the first and second trench portions and by making the digging depth of the second trench portion smaller than the digging depth of the first trench portion in a case where the widths of the first and second trench portions are 9 µm or less, and the digging depth of the second trench portion may be larger than the digging depth of the first trench portion in a case where the widths of the first and second trench portions are larger than 9 µm, the refractive index of light wave and the characteristic impedance are optimized, and the microwave characteristics are improved. Therefore, it is possible to sufficiently obtain both the effect of reducing the driving voltage and the effect of improving the microwave characteristics.

Advantageous Effects of Invention

According to an aspect of the present invention, it is possible to provide an optical modulator capable of sufficiently obtaining both the effect of reducing the driving voltage and the effect of improving the microwave characteristics. In terms of practical use, in particular, the present invention is effective in the realization of impedance matching, and the effect is high on the improvement in multi-level modulation in a DQPSK modulator, a QAM modulator, and the like or the improvement in an analog modulation signal.

DESCRIPTION OF EMBODIMENTS

Hereinafter, embodiments of the present invention will be described in detail with reference to the accompanying diagrams.

Figure 1:
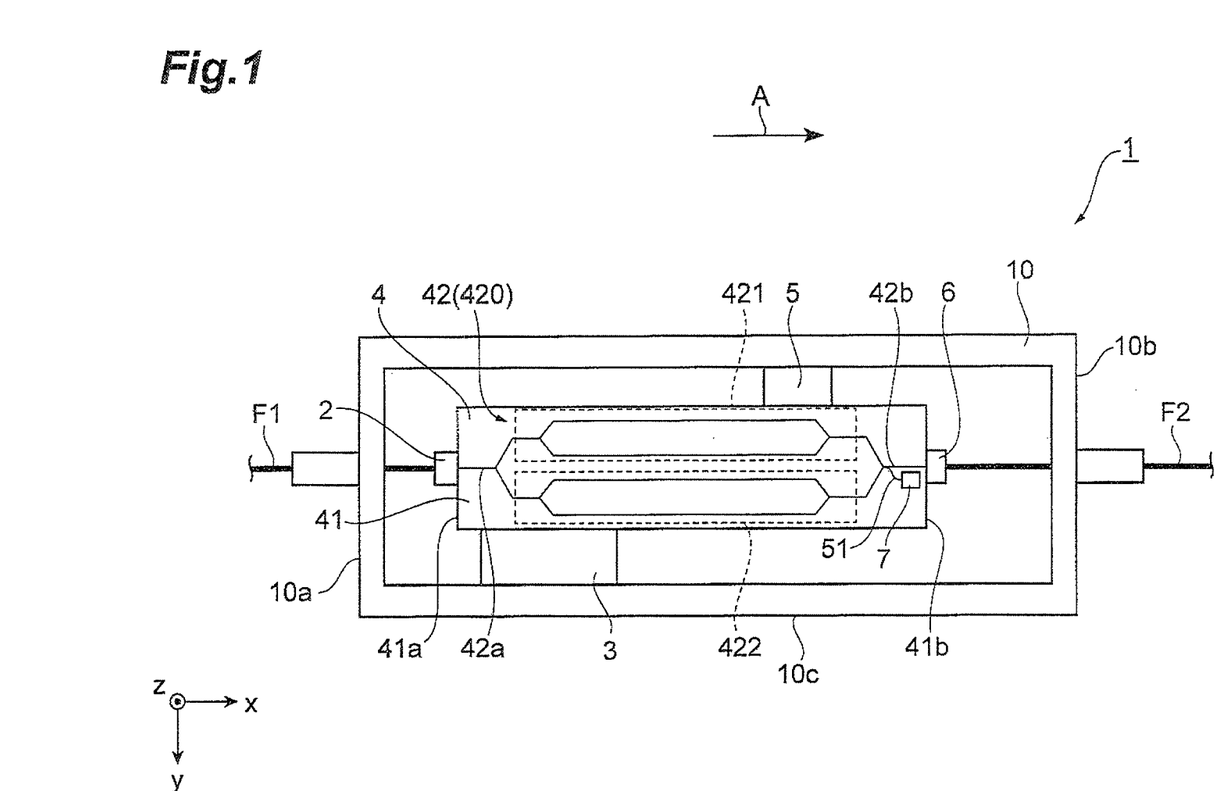
FIG. 1 is a diagram schematically showing the configuration of an optical modulator according to a first embodiment.

FIG. 1 is a diagram schematically showing the configuration of an optical modulator according to an embodiment. As shown in FIG. 1, an optical modulator 1 is a device that modulates input light wave guided by an optical fiber F1 and outputs the modulated light wave to an optical fiber F2. The optical modulator 1 can include an optical input unit 2, a relay unit 3, an optical modulating element 4, a terminator 5, an optical output unit 6, a monitor unit 7, and a case 10. The optical modulator 1 shown in FIG. 1 is a so-called Z-cut optical modulator made of lithium niobate.

The case 10 is a box-shaped member extending in one direction (hereinafter, referred to as a "direction A"), and is made of stainless steel, for example. The case 10 has one end surface 10a and the other end surface 10b that are both end surfaces in the direction A. A hole for the insertion of the optical fiber F1 is provided on the end surface 10a. A hole for the insertion of the optical fiber F2 is provided on the other end surface 10b. For example, the optical input unit 2, the relay unit 3, the optical modulating element 4, the terminator 5, the optical output unit 6, and the monitor unit 7 are housed in the case 10.

The optical input unit 2 supplies the input light wave guided by the optical fiber F1 to the optical modulating element 4. The optical input unit 2 may include a support member for supporting bonding between the optical fiber F1 and the optical modulating element 4.

The relay unit 3 relays a modulation signal, which is an electrical signal supplied from the outside, and outputs the modulation signal to the optical modulating element 4. The relay unit 3 receives a modulation signal, for example, through a modulation signal input connector provided on a side surface 10c of the case 10, and outputs the modulation signal to the optical modulating element 4.

The optical modulating element 4 is an element that converts the input light wave supplied from the optical input unit 2 into modulated light wave according to the modulation signal output from the relay unit 3. For example, the optical modulating element 4 is an LN optical modulating element. The optical modulating element 4 can include an electro-optic substrate 41, an optical waveguide 42, and a modulation electrode 43 (not shown in FIG. 1). The electro-optic substrate 41 is made of a dielectric material that exhibits an electro-optic effect, such as lithium niobate (LiNbO$_3$, hereinafter, referred to as "LN") for example. The electro-optic substrate 41 extends along the direction A, and has one end 41a and the other end 41b that are both ends in the direction A.

The optical waveguide 42 is provided on the electro-optic substrate 41. The optical waveguide 42 is, for example, a Mach-Zehnder type optical waveguide, and has a structure according to the modulation method of the optical modulating element 4. In this example, the modulation method of the optical modulating element 4 is a differential quadrature phase shift keying (DQPSK) modulation method. In this case, the optical waveguide 42 has a structure in which Mach-Zehnder portions 421 and 422 are provided on the two branch waveguides of a Mach-Zehnder portion 420. That is, an input waveguide 42a of the Mach-Zehnder portion 420 extends along the direction A from the one end 41a of the electro-optic substrate 41, and is branched and connected to the input end of the Mach-Zehnder portion 421 and the input end of the Mach-Zehnder portion 422. In an output waveguide 42b of the Mach-Zehnder portion 420, waveguides extending from the output end of the Mach-Zehnder portion 421 and the output end of the Mach-Zehnder portion 422 join and extend to the other end 41b along the direction A.

In the optical modulating element 4, input light wave that is input to the optical modulating element 4 from the optical input unit 2 is branched and input to the Mach-Zehnder portions 421 and 422 by the input waveguide 42a. The input light wave is modulated in the Mach-Zehnder portions 421 and 422. The modulated light wave modulated in the Mach-Zehnder portion 421 and the modulated light wave modulated in the Mach-Zehnder portion 422 are applied with a phase difference of 90° and are combined in the output waveguide 42b, and the combined light wave is output from the optical modulating element 4.

The terminator 5 is an electrical termination of the modulation signal. The terminator 5 can include a resistor corresponding to each modulation electrode 43 of the optical modulating element 4. One end of each resistor is electrically connected to the modulation electrode 43 of the optical modulating element 4, and the other end of each resistor is connected to the ground potential. The resistance value of each resistor is about 50Ω, for example.

The optical output unit 6 outputs the modulated light wave, which is output from the optical modulating element 4, to the optical fiber F2. The optical output unit 6 is provided on the other end 41b of the electro-optic substrate 41.

The monitor unit 7 monitors the complementary optical intensities of the light wave outputs of the Mach-Zehnder portions 421 and 422, for example. The monitor unit 7 can include a photoelectric conversion element. The photoelectric conversion element is an element for converting an optical signal into an electrical signal. For example, the photoelectric conversion element is a photodiode. The photoelectric conversion element is placed, for example, on the output waveguide 42b of the Mach-Zehnder portion 420 and the branched waveguide 51 on the LN substrate, and receives branched light wave and outputs an electrical signal corresponding to the optical intensity to a bias control unit (not shown).

Figure 2:
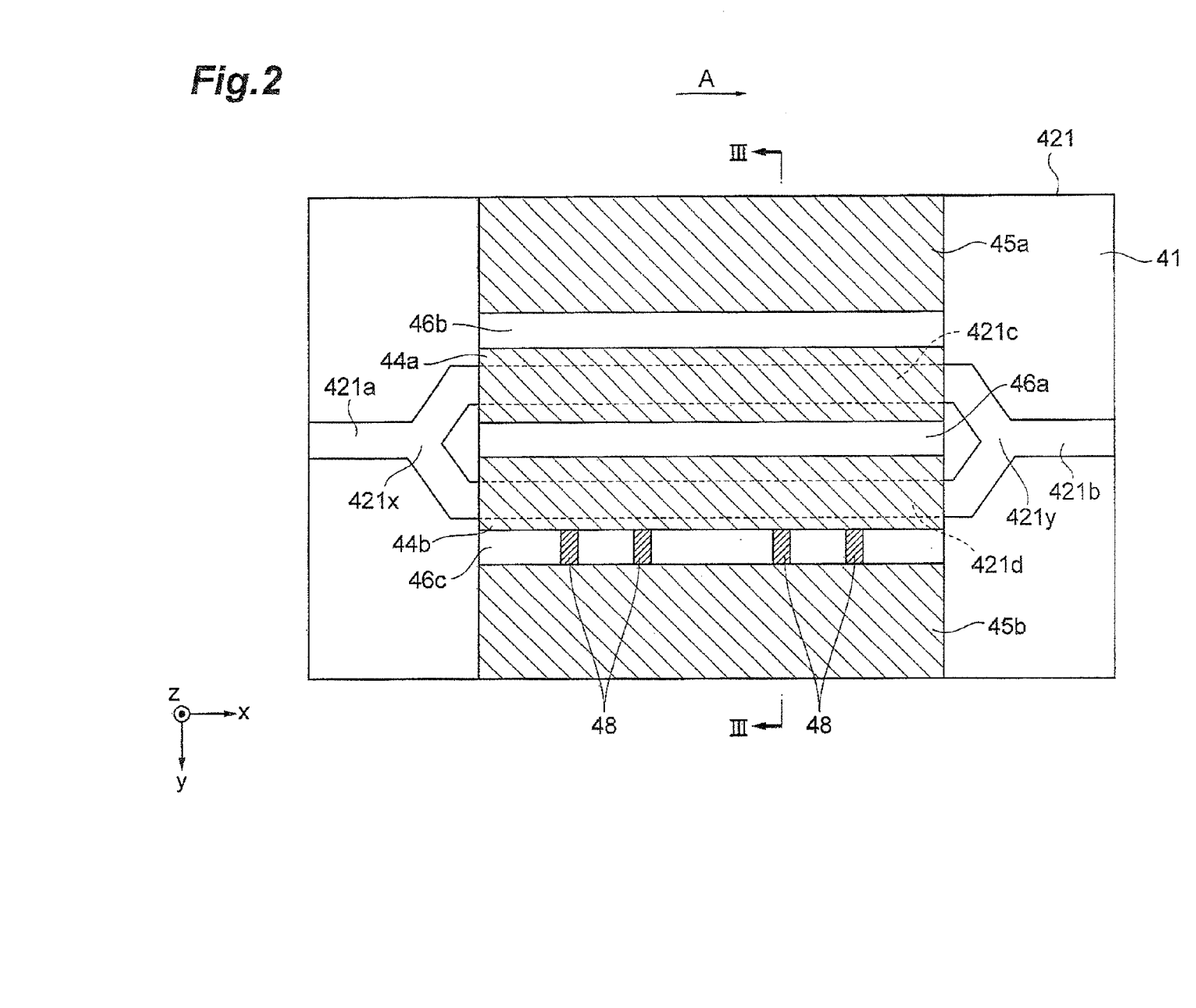
FIG. 2 is a schematic diagram of a Mach-Zehnder portion shown in FIG. 1.
Figure 3:
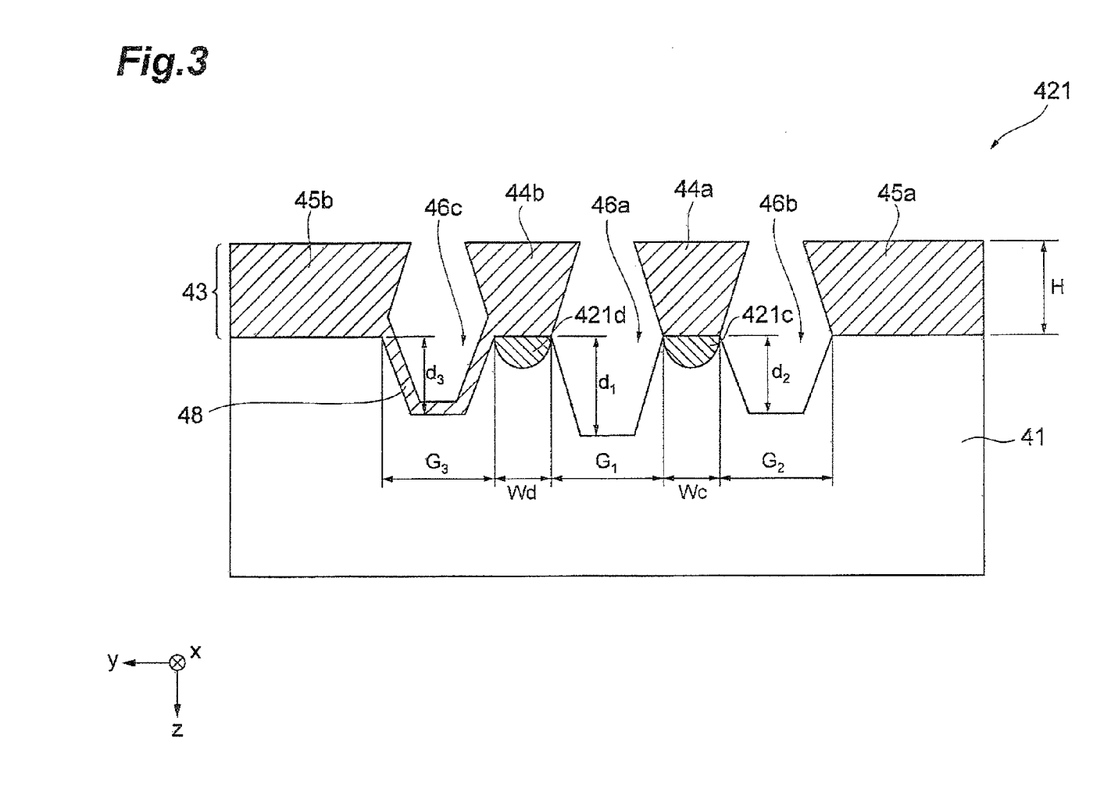
FIG. 3 is a schematic cross-sectional view of the Mach-Zehnder portion shown in FIG. 2 taken along line III-III.

Next, the detailed configuration of the Mach-Zehnder portion 421 will be described with reference to FIGS. 2 and 3. In addition, the main configuration of the Mach-Zehnder portion 422 is the same as that of the Mach-Zehnder portion 421. FIG. 2 is a schematic diagram of the Mach-Zehnder portion shown in FIG. 1. FIG. 3 is a schematic cross-sectional view of the Mach-Zehnder portion shown in FIG. 2 taken along the line III-III.

As the optical waveguide 42, the Mach-Zehnder portion 421 includes an input waveguide 421a, an output waveguide 421b, and branch waveguides 421c and 421d that are a pair of branched optical waveguides and extend along the direction A. That is, in the optical waveguide 42 of the Mach-Zehnder portion 421, the input waveguide 421a extending along the direction A is connected to the branch waveguides 421c and 421d at a branch point 421x, and the branch waveguides 421c and 421d are connected to the output waveguide 421b extending along the direction A at a joining point 421y. The branch point 421x and the joining point 421y may not be present on the LN substrate. For example, the branch point 421x and the joining point 421y may be formed on the silica waveguide.

On the electro-optic substrate 41, the modulation electrode 43 for modulating the light wave propagating through the branch waveguides 421c and 421d is provided. In terms of broadening the operating band of the optical modulator 1, a progressive wave type electrode that realizes velocity matching by making an electrical signal and a light wave propagate in the same direction is used as the modulation electrode 43. Specifically, a coplanar type electrode including a signal electrode 44a and ground electrodes 44b, 45a, and 45b disposed so as to interpose the signal electrode 44a therebetween is used as the modulation electrode 43. The ground electrodes 44b and 45b are electrically connected to each other by a connection portion 48. As shown in FIG. 2, a plurality of connection portions 48 are provided along the direction A in a trench portion 46c. The connection portion 48 may be provided on the entire surface of the trench portion 46c described later. The thickness H of the modulation electrode 43 is 10 μm to 80 μm, for example. The modulation electrode 43 is made of low-resistance metal, such as gold (Au).

The signal electrode 44a is an electrode for applying the electric field, which corresponds to the modulation signal output from the relay unit 3, to the branch waveguide 421c, and extends in the direction A in which the branch waveguide 421c extends. The signal electrode 44a is provided on the branch waveguide 421c. The arrangement and number of signal electrodes 44 are determined according to the direction of the crystal axis of the electro-optic substrate 41 and the modulation method of the optical modulating element 4. The length of the signal electrode 44a in the direction A is approximately the same as the lengths of portions extending in the direction A in the branch waveguides 421c and 421d. In addition, the width of the signal electrode 44a (in the y direction in the diagram) is larger than at least the width Wc of the branch waveguide 421c (in the y direction in the diagram) in the drawing.

The ground electrodes 44b, 45a, and 45b are electrodes that are grounded to have a ground potential, and extend in the direction A in which the branch waveguides 421c and 421d extend. The ground electrodes 45a and 45b are provided so as to interpose the signal electrode 44a therebetween in a direction in which the branch waveguides 421c and 421d are located opposite to each other, the direction is a direction (y direction in the diagram) crossing the direction A (x direction in the diagram) in which the branch waveguides 421c and 421d extend. The lengths of the ground electrodes 44b, 45a, and 45b in the direction A are approximately the same as the length of the signal electrode 44a in the direction A.

Between the modulation electrode 43 and the electro-optic substrate 41, in order to prevent the propagation loss of the light wave due to electrode metal, a buffer layer, which is made of a dielectric material (for example, $SiO_2$) having a lower refractive index than the LN that constitutes the electro-optic substrate 41, is formed (not shown). A charge dispersion film made of Si or the like is formed between the modulation electrode 43 and the buffer layer (not shown).

On the electro-optic substrate 41, trench portions 46a, 46b, and 46c are formed by digging (etching) the surface of the electro-optic substrate 41. By forming the trench portions 46a, 46b, and 46c, a portion interposed between the trench portions 46a and 46b in the electro-optic substrate 41 and a portion interposed between the trench portions 46a and 46c in the electro-optic substrate 41 are ridge portions having ridge shapes (ridge structures). The branch waveguides 421c and 421d are provided in the ridge portions of the electro-optic substrate 41. The trench portion 46a (first trench portion) is a trench portion formed between the branch waveguides 421c and 421d. The trench portion 46b is a second trench portion that is a trench portion other than the first trench portion, and is a trench portion formed between the branch waveguide 421c and a portion of the electro-optic substrate 41 immediately below the ground electrode 45a.

The relationship between the digging depths of the trench portions 46a and 46b is determined according to at least one of the width $G_1$ of the trench portion 46a (in the y direction in the diagram), the width $G_2$ of the trench portion 46b (in the y direction in the diagram), and the slope angle of the ridge shape. The digging depth of the trench portion 46a, which is the first trench portion, and the digging depth of the trench portion 46b, which is the second trench portion, are different. The width $G_1$ of the trench portion 46a, the width $G_2$ of the trench portion 46b, and the width $G_3$ of the trench portion 46c are the same size G. The slope angle of the ridge shape refers to an angle between a surface left as an upper surface of the ridge or a trench portion bottom surface and the ridge slope. In the present embodiment, the slope angle of the ridge shape is a value in the range of 70° to 85°.

The following effects can be expected by forming the branch waveguides 421c and 421d in ridge shapes. That is, first, it is possible to reduce the driving voltage by improving the effective overlap integral of the electric field generated by the electrical signal and propagating light waves in the branch waveguides 421c and 421d. Second, it is possible to improve the microwave characteristics by optimizing the effective refractive index (microwave effective refractive index) of high-frequency control signal (electrical signal) and the characteristic impedance.

The above optimization of the microwave effective refractive index will be described. As the optical modulator 1, in the broadband optical modulator, velocity matching between the electrical signal (microwave) propagating through the modulation electrode 43 and the light wave propagating through the waveguide is important. However, the refractive indices of the LN in the light wave region and in the microwave region are different greatly (refractive index n at the light wave 1.55 μm=2.2, refractive index $n_m$ at the microwave=4.2). Therefore, velocity matching is not possible if any solution method are not taken. Therefore, it is necessary to take velocity matching between the microwave and the light wave by relatively reducing the electric field distributed in the LN so that the effective refractive index of the microwave is brought close to the effective refractive index of the light wave.

The above optimization of the characteristic impedance will be described. The optimization of the characteristic impedance is reducing the reflection of the microwave by matching the impedance Z of the modulation electrode 43 to the 50-Ω system of a driving circuit and a connector.

Here, among the above-described effects obtained by forming the branch waveguides 421c and 421d in ridge shapes, a main factor relevant to the driving voltage is a digging depth $d_1$ of the trench portion 46a. In addition, the microwave characteristics (microwave effective refractive index and characteristic impedance) are determined based on the digging depth $d_1$ of the trench portion 46a and the digging depth $d_2$ of the trench portion 46b. The digging depth $d_3$ of the trench portion 46c may be the same as the digging depth $d_2$ in consideration of stress and the confinement of light wave.

The relationship among the digging depth, driving voltage $V_\pi$, microwave effective refractive index $n_m$, and impedance Z will be described with reference to FIGS. 4 to 6.

Figure 4:
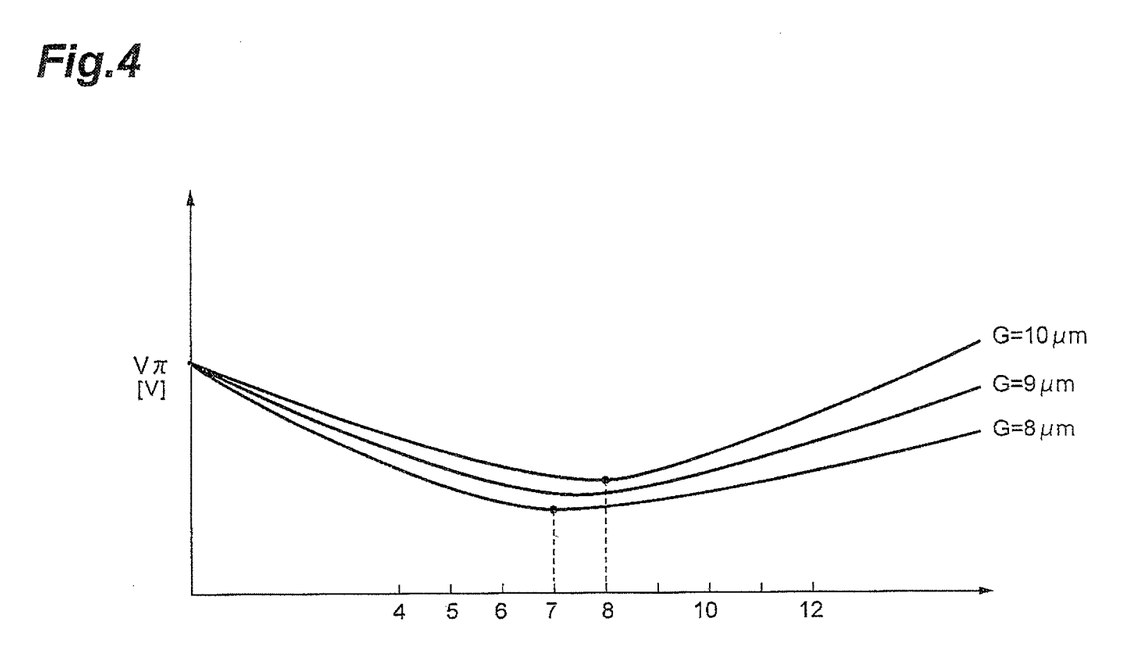
FIG. 4 is a schematic diagram showing the relationship between the digging depth of a trench portion and a driving voltage for each width of the trench portion.

FIG. 4 is a diagram showing the relationship between the digging depth of a trench portion and the driving voltage for each width of the trench portion. In the graph shown in FIG. 4, the vertical axis indicates the driving voltage $V_\pi$ (V) of the optical modulator 1, and the horizontal axis indicates the digging depth $d_1$ (μm) of the trench portion 46a. As shown in FIG. 4, the relationship between the digging depth of the trench portion and the driving voltage is a relationship of a downwardly In a case where the width G of each of the trench portions 46a and 46b is 8 μm that is a value of 9 μm or less, by setting that the digging depth $d_1$ of the trench portion 46a is 7 μm, the driving voltage $V_\pi$ will meet a minimum value. On the other hand, in a case where the width G of each of the trench portions 46a and 46b is 10 μm that is a value larger than 9 μm, by setting that the digging depth $d_1$ of the trench portion 46a is 8 μm, the driving voltage $V_\pi$ will meet a minimum value.

Figure 5:
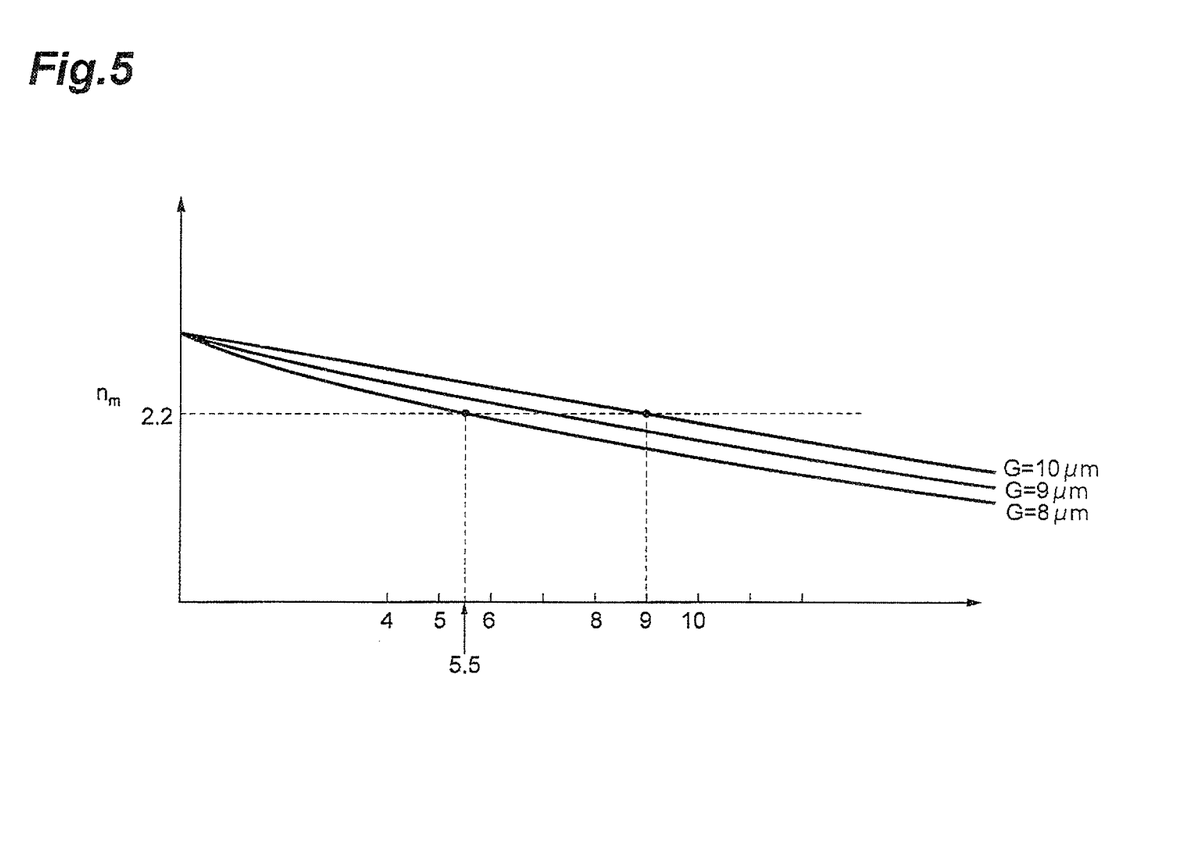
FIG. 5 is a schematic diagram showing the relationship between the digging depth of a trench portion and a microwave effective refractive index for each width of the trench portion.

FIG. 5 is a diagram showing the relationship between the digging depth of a trench portion and the microwave effective refractive index for each width of the trench portion. In the graph shown in FIG. 5, the vertical axis indicates the microwave effective refractive index $n_m$, and the horizontal axis indicates the digging depth $d_1$ (μm) of the trench portion 46a and the digging depth $d_2$ (μm) of the trench portion 46b. As shown in FIG. 5, the relationship between the digging depth of the trench portion and the microwave effective refractive index is a relationship of a monotonous rightward decreasing curve.

In a case where the width G of each of the trench portions 46a and 46b is 8 μm, in order to bring the microwave effective refractive index $n_m$ close to the effective refractive index n (2.2) of the light wave, the digging depth $d_1$ of the trench portion 46a and the digging depth $d_2$ of the trench portion 46b may be set to 5.5 μm. On the other hand, in a case where the width G of each of the trench portions 46a and 46b is 10 μm, in order to bring the microwave effective refractive index $n_m$ close to the effective refractive index n (2.2) of the light wave, the digging depth $d_1$ of the trench portion 46a and the digging depth $d_2$ of the trench portion 46b may be set to 9 μm.

Figure 6:
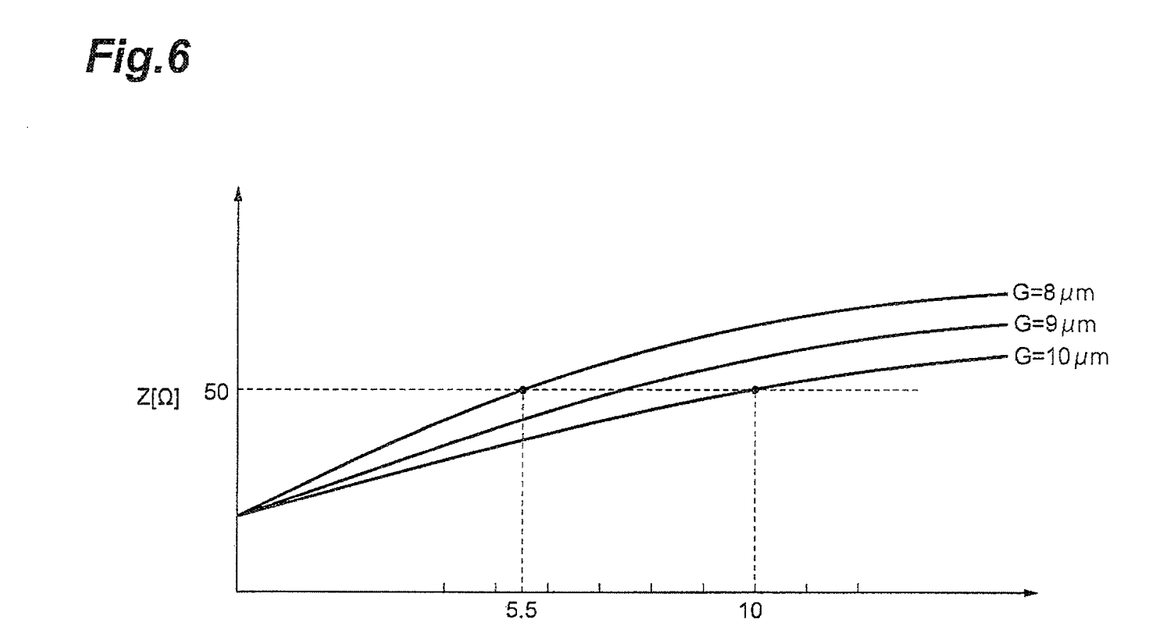
FIG. 6 is a schematic diagram showing the relationship between the digging depth of a trench portion and impedance for each width of the trench portion.

FIG. 6 is a diagram showing the relationship between the digging depth of a trench portion and impedance for each width of the trench portion. In the graph shown in FIG. 6, the vertical axis indicates the impedance Z (Ω), and the horizontal axis indicates the digging depth $d_1$ (μm) of the trench portion 46a and the digging depth $d_2$ (μm) of the trench portion 46b. As shown in FIG. 6, the relationship between the digging depth of the trench portion and impedance is a relationship of an upwardly convex curve.

In a case where the width G of each of the trench portions 46a and 46b is 8 μm, in order to match the impedance Z of the modulation electrode 43 to the 50-Ω system of a driving circuit and a connector, the digging depth $d_1$ of the trench portion 46a and the digging depth $d_2$ of the trench portion 46b may be set to 5.5 μm. On the other hand, in a case where the width G of each of the trench portions 46a and 46b is 10 μm, in order to match the impedance Z of the modulation electrode 43 to the 50-Ω system of a driving circuit and a connector, the digging depth $d_1$ of the trench portion 46a and the digging depth $d_2$ of the trench portion 46b may be set to 10 μm.

As described above, the relationship between the digging depths $d_1$ and $d_2$ of the trench portions 46a and 46b is determined according to the width G of each of the trench portions 46a and 46b. Specifically, the relationship between the digging depths $d_1$ and $d_2$ of the trench portions 46a and 46b is determined depending on whether the width G of each of the trench portions 46a and 46b is 9 μm or less or larger than 9 μm. That is, the digging depth $d_1$ of the trench portion 46a may be larger than the digging depth $d_2$ of the trench portion 46b in a case where the width G of each of the trench portions 46a and 46b is 9 μm or less, and the digging depth $d_1$ of the trench portion 46a may be smaller than the digging depth $d_2$ of the trench portion 46b in a case where the width G of each of the trench portions 46a and 46b is larger than 9 μm.

Figure 7:
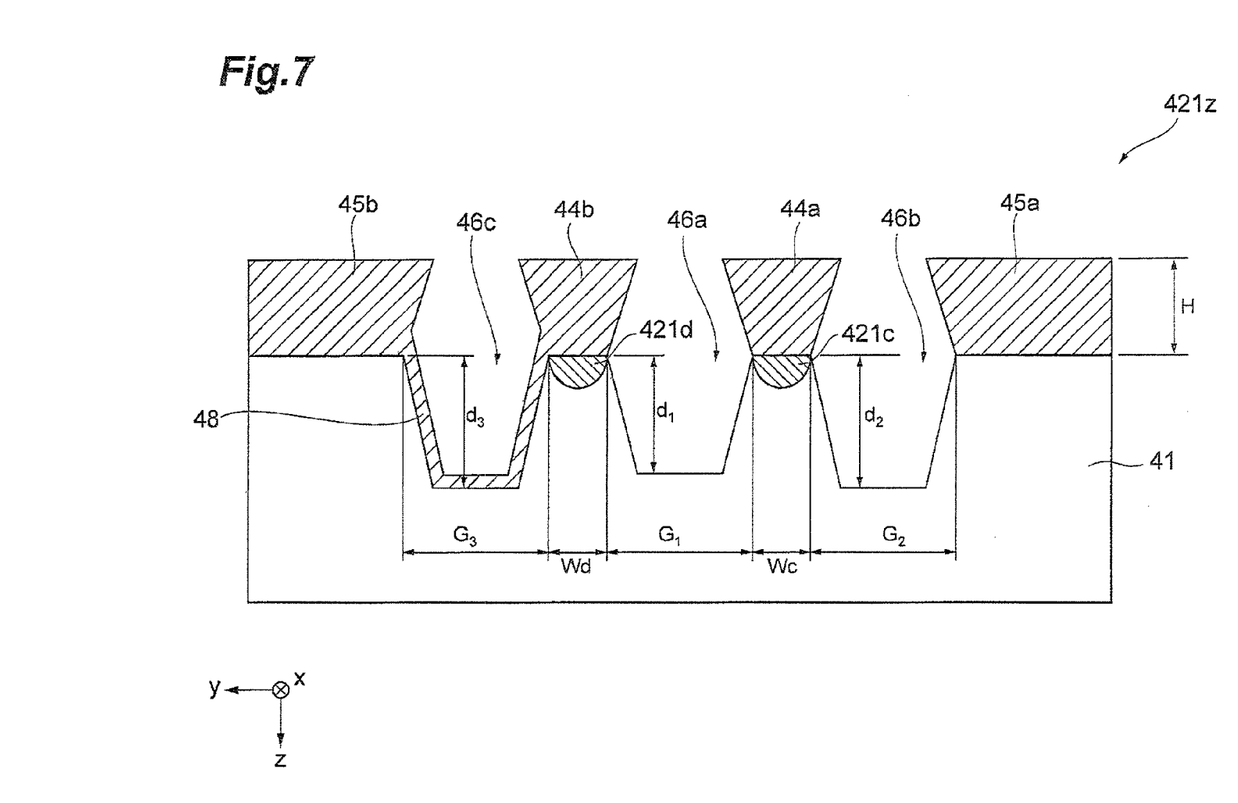
FIG. 7 is another example of the schematic cross-sectional view of the optical modulator.

The specific procedure of determining the digging depth $d_1$ of the trench portion 46a and the digging depth $d_2$ of the trench portion 46b will be described with reference to FIGS. 3 and 7. FIGS. 3 and 7 are cross-sectional views of a Mach-Zehnder portion. FIG. 3 is a cross-sectional view of the Mach-Zehnder portion 421 in which the width G of each of the trench portions 46a and 46b is 8 μm, and FIG. 7 is a cross-sectional view of a Mach-Zehnder portion 421z in which the width G of each of the trench portions 46a and 46b is 10 μm.

In the Mach-Zehnder portion 421 shown in FIG. 3, the width G of each of the trench portions 46a and 46b is 8 μm. Therefore, first, the value of the digging depth $d_1$ of the trench portion 46a is determined to be 7 μm so as to minimize the driving voltage $V_\pi$ (V) (refer to FIG. 4). Then, the digging depth $d_2$ of the trench portion 46b is determined to be 5.5 μm so that the microwave effective refractive index $n_m$ is brought close to 2.2 and the impedance Z (Ω) is brought close to 50Ω (refer to FIGS. 5 and 6). That is, the digging depth $d_1$ of the trench portion 46a is determined so as to be larger than the digging depth $d_2$ of the trench portion 46b.

In the Mach-Zehnder portion 421z shown in FIG. 7, the width G of each of the trench portions 46a and 46b is 10 μm. Therefore, first, the value of the digging depth $d_1$ of the trench portion 46a is determined to be 8 μm so as to minimize the driving voltage $V_\pi$ (V) (refer to FIG. 4). Then, the digging depth $d_2$ of the trench portion 46b is determined so that the microwave effective refractive index $n_m$ is brought close to 2.2 and the impedance Z (Ω) is brought close to 50Ω. Here, as shown in FIG. 5, the digging depth $d_2$ of the trench portion 46b may be set to 9 μm in terms of optimizing the microwave effective refractive index. On the other hand, in terms of optimizing the value of the impedance Z (Ω), the digging depth $d_2$ of the trench portion 46b may be set to 10 μm. In this case, the digging depth $d_2$ of the trench portion 46b may be determined to be a value in the range of 9 μm to 10 μm. That is, the digging depth $d_1$ of the trench portion 46a is determined so as to be smaller than the digging depth $d_2$ of the trench portion 46b.

In addition, setting the difference between the digging depth $d_1$ of the first trench portion (trench portion 46a) and the digging depth $d_2$ of the second trench portion (trench portion 46b) to 2 μm or less can be considered. Therefore, in the above example described with reference to FIGS. 3 and 7, since the difference between the digging depth $d_1$ of the trench portion 46a and the digging depth $d_2$ of the trench portion 46b is 2 μm or less, the conditions are satisfied.

Thus, in the optical modulator 1 according to the present embodiment, trench portions for forming the branch waveguides 421c and 421d in ridge shapes are formed on both sides of the branch waveguides 421c and 421d, and the trench portion 46a (first trench portion) that is a trench portion between the branch waveguides 421c and 421d and the trench portion 46b (second trench portion) that is another trench portion are formed so as to have different digging depths.

The driving voltage of the optical waveguide is mainly determined based on the digging depth of the first trench portion, and the microwave characteristics of the optical waveguide are determined based on the digging depths of the first and second trench portions. Conventionally, the digging depth of each trench portion has not been determined in consideration of such a ridge shape (width and angle), electrode shape, and location where an electrode is formed. Accordingly, in terms of reducing the driving voltage and improving the microwave characteristics, the digging depth of each trench portion is not necessarily an appropriate value.

In this respect, in the optical modulator 1 according to the present embodiment, the digging depth $d_1$ of the trench portion 46a can be set to a depth suitable for reducing the driving voltage of the optical waveguide and the digging depth $d_2$ of the trench portion 46b can be set to a depth suitable for improving the microwave characteristics by forming the trench portion 46a, which is the first trench portion, and the trench portion 46b, which is the second trench portion, so as to have different digging depths $d_1$ and $d_2$. Therefore, it is possible to sufficiently obtain both the effect of reducing the driving voltage and the effect of improving the microwave characteristics.

In addition, the stress applied to the electro-optic substrate 41 is reduced by setting the difference between the digging depth $d_1$ of the first trench portion (trench portion 46a) and the digging depth $d_2$ of the second trench portion (trench portion 46b) to 2 μm or less.

The relationship between the digging depth $d_1$ of the trench portion 46a, which is the first trench portion, and the digging depth $d_2$ of the trench portion 46b, which is the second trench portion, is determined according to at least one of the width G of each of the trench portions 46a and 46b and the slope angle of the ridge shape. Accordingly, a reduction in the driving voltage and an improvement in the microwave characteristics are appropriately realized for each width G of the trench portions 46a and 46b.

In addition, by making the digging depth $d_1$ of the trench portion 46a larger than the digging depth $d_2$ of the trench portion 46b in a case where the width G of each of the trench portions 46a and 46b is 9 μm or less and making the digging depth $d_1$ of the trench portion 46a smaller than the digging depth $d_2$ of the trench portion 46b in a case where the width G of each of the trench portions 46a and 46b is larger than 9 μm, it is possible to sufficiently obtain both the effect of reducing the driving voltage and the effect of improving the microwave characteristics as described above with reference to FIGS. 3 to 7.

Heretofore, the configuration in which the modulation signal is supplied to the signal electrode 44a in order to perform modulation has been described with reference to FIG. 3. However, also for a configuration in which the ground electrode 44b is separated from the ground electrode 45b so as to serve as a signal electrode and the optical modulator is driven by supplying a differential signal to the signal electrodes 44a and 44b, the difference among the digging depths $d_1$, $d_2$, and $d_3$ of the trench portions 46a, 46b, and 46c can be similarly used to improve the degree of freedom in a characteristics design. In addition, also in the case of a configuration in which the ground electrodes 45a and 45b protrude to the bottoms of the trench portions 46a, 46b, and 46c, the difference among the digging depths $d_1$, $d_2$, and $d_3$ of the trench portions 46a, 46b, and 46c can be similarly used to improve the degree of freedom in characteristics design. However, the digging depth dependency of the characteristic impedance is considerably different from the characteristic curve shown in FIG. 5. Also in the case in which the ground electrode 44b functions as a signal electrode, the difference among the digging depths $d_1$, $d_2$, and $d_3$ of the trench portions 46a, 46b, and 46c can be similarly used to improve the degree of freedom in characteristics design.

The optical modulator according to the present invention is not limited to the embodiment described above. For example, although the optical waveguide 42 provided on the electro-optic substrate 41 has been described as a Mach-Zehnder type optical waveguide, the present invention is not limited thereto, and other optical modulators including optical waveguides and signal electrodes may also be used. In addition, although the case has been described in which the coplanar electrode is used as the modulation electrode 43, other electrodes including at least signal electrodes may be used as the modulation electrode 43. In order to simplify the explanation, an example has been described in which the ground electrode is formed in the ridge portion instead of the groove. However, it is needless to say that the degree of freedom in characteristics design is enhanced even if the ground electrode is formed in the groove.

REFERENCE SIGNS LIST

1: optical modulator
41: electro-optic substrate
42: optical waveguide
44a: signal electrode
44b, 45a, 45b: ground electrode
46a: trench portion (first trench portion)
46b, 46c: trench portion (second trench portion)
420, 421, 421z, 422: Mach-Zehnder portion
421c, 421d: branch waveguide (optical waveguide)

The invention claimed is:
1. An optical modulator comprising:
an electro-optic substrate;
an optical waveguide; and
a modulation electrode including a signal electrode for applying an electric field corresponding to a modulation signal to the optical waveguide, and a ground electrode,
wherein the electro-optic substrate includes a trench portion formed by digging a surface of the electro-optic substrate, and a ridge portion formed in a ridge shape by the trench portion so that the optical waveguide is provided,
the signal electrode is provided on the ridge portion and is configured so as to be wider than a width of the ridge portion at a cross section in a direction intersecting with a direction of extension of the optical waveguide,
the ground electrode is configured so as to reach to a bottom portion of the trench portion,
the trench portion includes a first trench portion, which is a trench portion between a pair of branched optical waveguides, and a second trench portion, which is a trench portion other than the first trench portion, digging depths of the first and second trench portions are different, and the optical modulator is a multi-level phase modulator.

2. The optical modulator according to claim 1,
wherein a difference between the digging depths of the first and second trench portions is 2 μm or less.

3. The optical modulator according to claim 2,
wherein a relationship between the digging depths of the first and second trench portions is determined according to at least one of the ridge shape and widths of the first and second trench portions.

4. The optical modulator according to claim 3,
wherein the digging depth of the first trench portion is larger than the digging depth of the second trench portion in a case where the widths of the first and second trench portions are 9 μm or less, and the digging depth of the first trench portion is smaller than the digging depth of the second trench portion in a case where the widths of the first and second trench portions are larger than 9 μm.

5. The optical modulator according to claim 1,
wherein a relationship between the digging depths of the first and second trench portions is determined according to at least one of the ridge shape and widths of the first and second trench portions.

6. The optical modulator according to claim 5,
wherein the digging depth of the first trench portion is larger than the digging depth of the second trench portion in a case where the widths of the first and second trench portions are 9 μm or less, and the digging depth of the first trench portion is smaller than the digging depth of the second trench portion in a case where the widths of the first and second trench portions are larger than 9 μm.

7. The optical modulator according to claim 1, wherein the optical modulator is a Z-cut optical modulator made of lithium niobate.

8. The optical modulator according to claim 1,
wherein the ridge portion has an upright trapezoidal shape at a cross section in a direction intersecting with a direction of extension of the optical waveguide, and has a base angle of 70 degrees or more.

* * * * *